United States Patent [19]

Zlotek

[11] Patent Number: 5,070,976
[45] Date of Patent: Dec. 10, 1991

[54] SPRAG RETAINER

[75] Inventor: Thaddeus F. Zlotek, Center Line, Mich.

[73] Assignee: Dana Corporation, Toledo, Ohio

[21] Appl. No.: 634,903

[22] Filed: Dec. 27, 1990

[51] Int. Cl.⁵ ............................................ F16D 41/07
[52] U.S. Cl. ................................. 192/45.1; 192/41 A
[58] Field of Search ............................ 192/41 A, 45.1

[56] References Cited

U.S. PATENT DOCUMENTS

| | | |
|---|---|---|
| 2,044,663 | 6/1936 | Brodin . |
| 2,386,013 | 10/1945 | Swenson .......................... 192/45.1 |
| 2,427,120 | 9/1947 | Blair . |
| 2,520,004 | 8/1950 | Gondek . |
| 2,598,864 | 6/1952 | Turner . |
| 2,624,436 | 1/1953 | Gamble . |
| 2,630,896 | 3/1953 | Dodge . |
| 2,683,509 | 7/1954 | Jandasek . |
| 2,691,435 | 10/1954 | Klamp ............................. 192/45.1 |
| 2,717,677 | 9/1955 | Swenson . |
| 2,724,471 | 11/1955 | Dodge . |
| 2,731,122 | 1/1956 | Dodge . |
| 2,748,912 | 6/1956 | Banker . |
| 2,763,354 | 9/1956 | Szady ............................. 192/45.1 |
| 2,777,551 | 1/1957 | Banker . |
| 2,912,086 | 11/1959 | Troendly et al. . |
| 2,933,803 | 4/1960 | Schaeffler . |
| 3,027,626 | 4/1962 | Murphy . |
| 3,034,622 | 5/1962 | Lund . |
| 3,049,206 | 8/1962 | Zlotek ............................ 192/45.1 |
| 3,075,623 | 1/1963 | Lund . |
| 3,199,935 | 8/1965 | Pitner . |
| 3,219,163 | 11/1965 | Zlotek . |
| 3,251,118 | 5/1966 | Pitner . |
| 3,253,869 | 5/1966 | Smith . |
| 3,314,510 | 4/1967 | Zlotek . |
| 3,324,980 | 6/1967 | Rojic et al. . |
| 3,344,686 | 10/1967 | Baker . |
| 3,416,211 | 12/1968 | Ahlman . |
| 3,545,581 | 12/1970 | Kent . |
| 3,550,737 | 12/1970 | Kent . |
| 3,598,212 | 8/1971 | Giese .......................... 192/41 A X |
| 3,702,649 | 11/1972 | Giese et al. . |
| 3,733,111 | 5/1973 | Harlan et al. . |
| 3,849,853 | 11/1974 | Iffland . |
| 3,952,849 | 4/1976 | Brownhill et al. . |
| 3,992,764 | 11/1976 | Serasio . |
| 4,018,318 | 4/1977 | Hallerberg . |
| 4,347,920 | 9/1982 | Bordes . |
| 4,347,921 | 9/1982 | Bordes . |
| 4,360,093 | 11/1982 | Wakabayashi et al. . |
| 4,397,507 | 8/1983 | Kraus et al. . |
| 4,494,636 | 1/1985 | Wakabayashi et al. . |
| 4,584,749 | 4/1986 | Horling et al. . |
| 4,677,720 | 7/1987 | Alling et al. . |
| 4,682,677 | 7/1987 | Message . |
| 4,689,982 | 9/1987 | Olschewski et al. . |
| 4,707,152 | 11/1987 | Neese . |
| 4,736,827 | 4/1988 | Kinoshita . |
| 4,792,028 | 12/1988 | Nishimura et al. . |
| 4,867,292 | 9/1989 | Hartig .............................. 192/41 A |
| 4,928,801 | 5/1990 | Laurent ....................... 192/41 A X |

FOREIGN PATENT DOCUMENTS

| | | | |
|---|---|---|---|
| 519199 | 12/1955 | Canada ............................. 192/45.1 |
| 632292 | 12/1961 | Canada ............................. 192/45.1 |
| 2588340 | 4/1987 | France ............................. 192/41 A |

Primary Examiner—Rodney H. Bonck

[57] ABSTRACT

An improved sprag clutch is disclosed. A retainer for the sprags is generally U-shaped in cross-section. Legs at each axial end of the retainer extend radially outwardly of a central planar portion, which has notches to position the sprags. The U-shaped cross-section allows the use of a thin metal for forming the retainer body. A disclosed sprag has a single central spring notch at its inner periphery, and a solid contact surface at its outer periphery.

9 Claims, 1 Drawing Sheet

SPRAG RETAINER

BACKGROUND OF THE INVENTION

This application in general relates to an improved sprag clutch. More particularly, the present invention relates to an improved sprag and retainer combination that is inexpensive to manufacture and assemble.

Sprag clutches are well known and utilized in various applications. In such clutches, an outer race is connected to a first shaft and an inner race, received at the inner periphery of the outer race, is connected to a second shaft. A plurality of sprags are pivotally received between the inner and outer races to selectively transmit rotation between the two.

Typically, a retainer ensures that each of the plurality of sprags is properly positioned between the circumference of the inner race and the outer race. These retainers extend beyond the axial extent of the sprags, and typically include notches through which the sprag extends. The retainer must contact the sprag at a minimum contact point radially inwardly in a direction towards the inner race in order to properly mount the sprags for pivotal movement. The minimum contact point varies with a particular sprag geometry, and the calculation of the contact point is within the skill of a worker in the art. The retainer typically has a portion radially outwardly of this minimum contact point to provide concentricity to the retainer. Typically, the retainer extends radially outwardly to a position adjacent the inner periphery of the outer race.

Retainers are typically formed from a cylindrical member, with notches punched through the thickness of the cylindrical member at a central position. Retainers must be of a certain minimum thickness at the axial ends, or the punching of the notches through the axial center of the retainer deforms the axial ends. In many prior art retainers the retainer is formed of a minimum thickness that is of the size required at the ends throughout its axial extent. This is undesirable since it results in bulky retainers which require a large amount of material and are relatively expensive.

In one prior art retainer, a relatively thin tubular member has ends bent radially inwardly to define thicker end portions. The radially inwardly extending ends result in thick portions at the axial ends to resist deflection when notches are punched in the center of the retainer.

Such retainers are widely used, however, some deficiencies exist with this type of retainer. As mentioned above, there is a certain minimum contact point for contact between the retainer and the sprag members, and there is preferably a portion of the retainer radially outward of this point. Since the legs in the above-discussed retainer extend radially inwardly from the notches, it is sometimes difficult to achieve the minimum contact point between the retainer and the sprags, and also to have a portion radially outward of the minimum contact point. In some prior art retainers, the center portion of the retainer is curved radially inwardly to define a groove centered above a central axis of the retainer. A center of the retainer does contact the sprags at the minimum contact point, while other portions are disposed radially outward. The ends extend radially inwardly beyond the minimum contact point. Forming the center with this complicated cross-section is, however, undesirable.

Sprag members typically have notches formed at each axial end to receive springs that extend throughout the circumference of the clutch member. The springs urge the sprags to a first pivoted position. The use of the two notches may undesirably complicate the manufacture of the sprag.

In response to this problem, some prior art clutches may have utilized sprags which have a single central notch at an inner periphery to receive a single spring. This results in a sprag that is less complicated than the above-discussed sprags, however, these sprags are sometimes difficult to mount, and often required other structural features to provide an adequate mount. In one known sprag that has a center notch, a central bearing notch is formed at an outer periphery. This bearing notch provides additional guidance to the sprag. The requirement of forming this additional bearing notch in the outer periphery, however, eliminates one benefit of using a central spring notch, namely reducing the number of notches in the sprag. Further, this bearing notch at the outer periphery reduces the contact area between the sprag and the inner periphery of the outer race, which is also undesirable.

SUMMARY OF THE INVENTION

In a disclosed embodiment of the present invention, a sprag retainer is generally U-shaped in cross-section and has a central planar portion with two legs extending radially outwardly from the planar portion. The legs extend to a position adjacent the inner periphery of the outer race. The planar portion has notches to receive the sprags. Since the planar portion is the radially innermost portion of the retainer, it is relatively easy to ensure that the retainer does contact the sprags at the desired minimum contact point. The legs are disposed radially outwardly of the notches to provide proper support and concentricity. Such a retainer is relatively simple to manufacture since it is formed in a die, or by spinning, from a cylindrical member by merely bending each end radially outwardly to form the legs.

In another feature of the present invention, the sprags have an axially centered notch at an inner periphery. The notch receives a single spring which extends through the notches into each of the sprags. The sprag has a solid contact surface at its outer periphery which contacts the inner periphery of the outer race. Due to the solid contact surface, frictional contact between the sprag and the outer race occurs through the entire axial extent of the sprag.

The retainer legs extending radially outwardly to a position adjacent the outer race provides improved guidance for the retainer and for the sprags over prior art retainers. This inventive retainer allows the use of a sprag having a center notch, with no guiding surface formed at its outer periphery.

These and other objects and features of the present invention can be best understood from the following specification and drawings, of which the following is a brief description.

DETAILED DESCRIPTION OF THE PREFERRED EMBODIMENT

Figure 1:
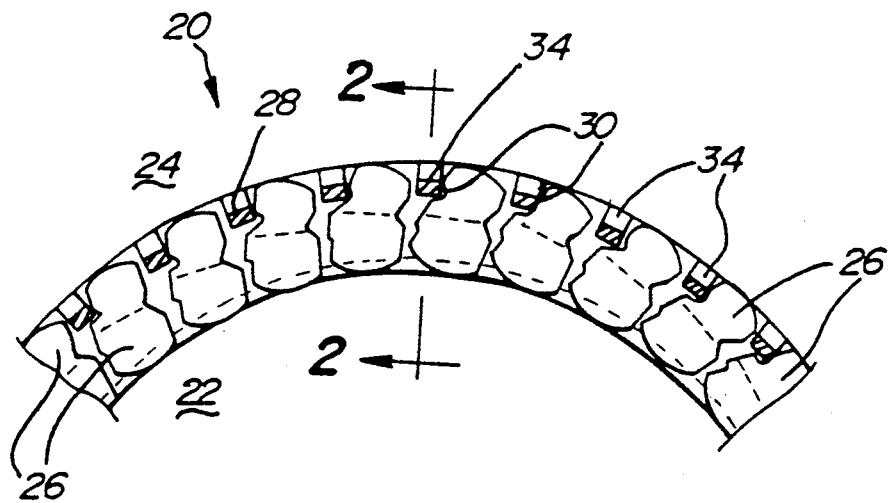
FIG. 1 is a partial cross-sectional view through a clutch according to the present invention.

Sprag clutch 20, illustrated in FIG. 1, selectively transmits rotation between inner race 22 and outer race 24. A plurality of sprags 26 are received in the radial space between inner race 22 and outer race 24. This type of clutch is well known in the prior art, and its functional details form no part of this invention.

Retainer 28 includes central planar section 30 having a plurality of portions which separate adjacent sprags 26. Sprags 26 are received in notches 32 in retainer 28, and a leg 34 is formed on retainer 28 at each axial end of sprags 26. Retainer 28 ensures that sprags 26 are properly spaced and positioned such that they operate to properly transmit rotation between inner race 22 and outer race 24.

Retainer 28 must engage sprags 26 at a minimum contact position radially inwardly towards the central axis of inner race 22. Sprags 26 pivot during relative movement of inner race 22 and 24 and the minimum contact point is necessary to properly guide the sprags during this pivotal movement. The exact minimum contact point between retainer 28 and sprag 26 varies with the geometry of sprag 26.

Figure 2:
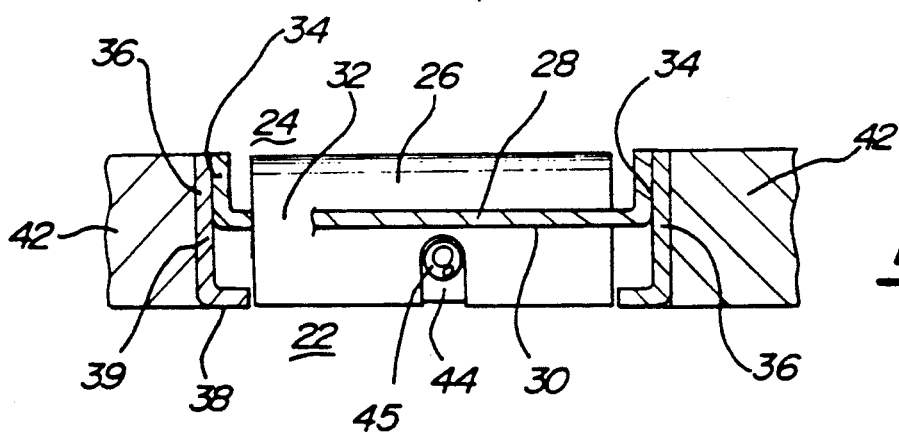
FIG. 2 is a cross-sectional view along line 2—2 as shown in FIG. 1.

FIG. 2 is a cross-sectional view along line 2—2 as shown in FIG. 1. Sprag 26 is received in notch 32 which extends through planar portion 30 of retainer 28, shown partially cut-away. Legs 34 extend radially outwardly and perpendicular to planar portion 30 at each axial end of sprag 26. Thus, retainer 28 is generally U-shaped in cross-section. Since legs 34 extend radially outwardly from planar portion 30, legs 34 may extend to a position adjacent the inner periphery of outer race 24, while planar portion 30 still contacts sprag 26 at the minimum contact point.

Since legs 34 are bent relative to planar portion 30, there are enlarged sections at each axial end of retainer 28. Thus, when notches 32 are punched out of planar portion 30 the force does not deform the axial ends of retainer 28. As such, retainer 28 may be formed of relatively thin metal and is easily shaped. In one preferred example, a cylindrical steel member is shaped in a die to be U-shaped in cross-section. Notches 32 are then punched through planar portion 30 to form retainer 28. In one embodiment, the retainer is formed from a low-carbon sheet metal steel.

Bushings 36 are preferably disposed at each axially end of retainer 28 to maintain proper concentricity between inner race 22 and outer race 24. First leg 38 of bushing 36 extends axially inwardly towards sprag 26 and second leg 39 extends radially along leg 34 of retainer 28. Bushings 36 are preferably stamped from copper alloy. In some embodiments where concentricity for the inner race to the outer race is provided by other bearings, the bushings 36 would not be required.

Blocks 42 are positioned at each axial end of bushings 36 to retain them in a proper axial position. Blocks 42 are shown somewhat schematically, but could be any member which would prevent axial movement of bushings 36, such as a bearing.

Sprag 26 includes central notch 44 which receives spring 45 to bias the plurality of sprags 26 to the proper orientation relative to inner race 22 and outer race 24. Since notch 44 is formed in the center of sprag 26, only a single such spring is utilized. Further, the outer surface 46 of sprag 26 provides a solid contact surface on outer race 24 through its entire axial extent. As such, a smaller sprag member may be utilized since the contact surface extends over a relatively greater area than some center notched prior art sprags. Notch 44 does not extend radially outwardly to reach the position of retainer 28. This provides protection to spring 45 during pivotal movement of the sprags. Further, if the center notch did reach the retainer there would be less contact area between the retainer and the sprag at the minimum contact point. In one embodiment the sprag was formed of SAE 52100 steel.

The profile of sprag 26 as illustrated in FIG. 1 is such that it is thicker than notch 32 radially inwardly of notch 32. This retains sprags 26 on retainer 28 when they are biased outwardly by spring 45. The second function of this shape is that the sprags are prevented from rolling over, under high torque loads that are beyond design requirements.

The combination of the U-shaped retainer 28 having legs 34 extending radially outwardly, in combination with notch 44 formed in a central planar portion 30 ensure that sprags 26 are properly guided. This eliminates the requirement of having a bearing surface at the outer periphery of sprags 26.

Figure 3:
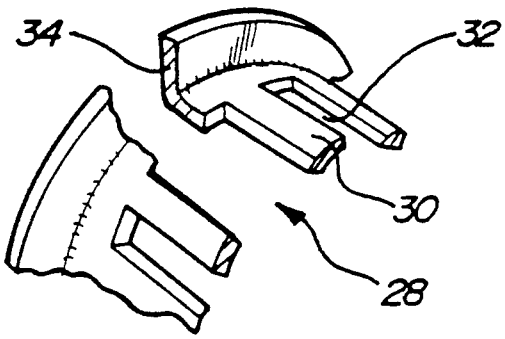
FIG. 3 is a partial perspective view of a sprag retainer according to the present invention.

FIG. 3 is a perspective view of a portion of retainer 28. Planar portion 30 includes a plurality of spaced notches 32 to receive sprags 26. Legs 34 extend radially outwardly away from, and perpendicular to, planar portion 30. Preferably, legs 34 are bent in a die to give retainer 28 its generally U-shaped cross-section. They can also be spun or machined for prototype lots.

This above-disclosed configuration is particularly applicable to two versions of sprags known in the art as centrifically engaging and centrifically disengaging. The latter is used in many starter applications.

A preferred embodiment of the present invention has been disclosed, however, a worker of ordinary skill in the art would recognize that certain modifications would come within the scope of this invention. For this reason the following claims should be studied in order to determine the true scope and content of the present invention.

I claim:

1. A clutch comprising:
    an inner race mounted for rotation about an axis;
    an outer race surrounding said inner race and also mounted for rotation about said axis;
    a plurality of sprag members for transmitting rotation between said inner race and said outer race, said sprag members located radially between said inner race and said outer race;
    a generally cylindrical sprag retainer positioned between said inner race and said outer race and having sprag notches to mount said sprags in a proper position, said cylindrical retainer being generally U-shaped in cross-section in a plane extending radially outwardly from said axis and along said axis, said U-shaped cross-section being defined by a central planar portion and two leg portions extending radially outwardly of each axial ends of said central planar portion, said central planar portion receiving said sprag notches, said leg portions extending perpendicular to said central planar portion; and
    wherein each of said sprags have a central notch extending radially into said sprags from an inner periphery at a location generally in the center of said sprag measured along said axis.

2. A clutch as recited in claim 1, wherein said sprag having an outer peripheral surface in contact with said outer race throughout its axial extent.

3. A clutch as recited in claim 2, wherein said central notch having a radially outermost portion of a first radius, said sprag notches having a radially innermost portion of a second radius, and said second radius being greater than said first radius.

4. A clutch as recited in claim 3, wherein a spring is received in said central notches of each of said plurality of sprags.

5. A clutch as recited in claim 1, wherein a generally cylindrical L-shaped bearing is positioned axially outwardly of each of said legs of said retainer, said L-shaped bearings each having a leg extending axially inwardly and being radially within said retainer, and a second leg extending at least partially along said leg of said retainer.

6. A clutch as recited in claim 1, wherein said sprag notch having a radially innermost portion of a second radius, and said legs having a radially innermost port of a third radius, said third radius being equal to said second radius.

7. A clutch comprising:
an inner race mounted for rotation about an axis;
an outer race surrounding said inner race and also mounted for rotation about said axis;
a plurality of sprag members for transmitting rotation between said inner race and said outer race, said sprag members located radially between said inner race and said outer race
a generally cylindrical sprag retainer positioned between said inner race and said outer race and having sprag notches to mount said sprags in a proper position, said cylindrical retainer being generally U-shaped in cross-section in a plane extending radially outwardly from said axis and along said axis, said U-shaped cross-section being defined by a central planar portion and two leg portions extending radially outwardly of each axial ends of said central planar portion, said central planar portion receiving said sprag notches;
wherein each of said sprags have a central notch extending radially into said sprags from an inner periphery at a location generally in the center of said sprag measured along said axis, a spring being received in said central notches of each of said plurality of sprags; and
said central notch having a radially outermost portion a first distance from said axis, said sprag notches having a radially innermost portion a second distance from said axis, and said second distance being greater than said first distance.

8. A clutch as recited in claim 7, wherein said legs are formed perpendicular to said central planar portion.

9. A clutch comprising:
an inner race mounted for rotation about an axis;
an outer race surrounding said inner race and also mounted for rotation about said axis;
a plurality of sprag members for transmitting rotation between said inner race and said outer race, said sprag members located radially between said inner race and said outer race;
a generally cylindrical sprag retainer positioned between said inner race and said outer race and having sprag notches to mount said sprags in a proper position, said cylindrical retainer being generally U-shaped in cross-section in a plane extending radially outwardly from said axis and along said axis, said U-shaped cross-section being defined by a central planar portion and two leg portions extending radially outwardly of each axial ends of said central planar portion, said central planar portion receiving said sprag notches; and
wherein a generally cylindrical L-shaped bearing is positioned axially outwardly of each of said legs of said retainer, said L-shaped bearings each having a leg extending axially inwardly and being radially within said retainer, and a second leg extending at least partially along said leg of said retainer.

* * * * *

UNITED STATES PATENT AND TRADEMARK OFFICE
CERTIFICATE OF CORRECTION

PATENT NO. : 5,070,976

DATED : 12/10/91

INVENTOR(S) : Thakkeus F. Zlotek

It is certified that error appears in the above-identified patent and that said Letters Patent is hereby corrected as shown below:

In column 5, claim 6, line 22, please delete "port", and insert --portion--.

Signed and Sealed this

Thirteenth Day of April, 1993

*Attest:*

STEPHEN G. KUNIN

*Attesting Officer*     Acting Commissioner of Patents and Trademarks